No. 694,950. Patented Mar. 11, 1902.
J. DROVER.
THREAD MEASURING AND CUTTING DEVICE FOR SPOOL CABINETS.
(Application filed Apr. 22, 1901.)
(No Model.) 3 Sheets—Sheet 1.
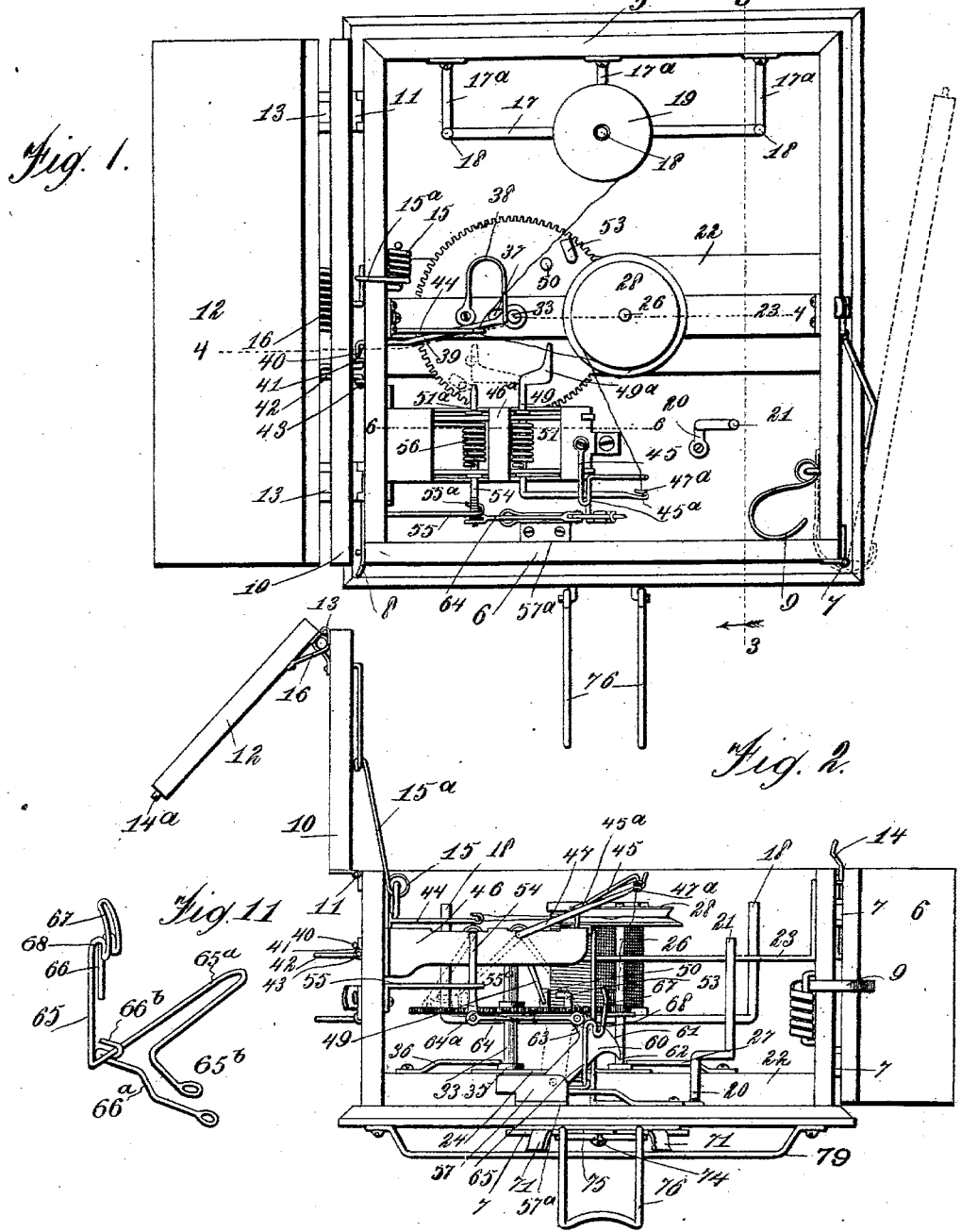
Witnesses: James Drover, Inventor
By Marion & Marion
Attorneys

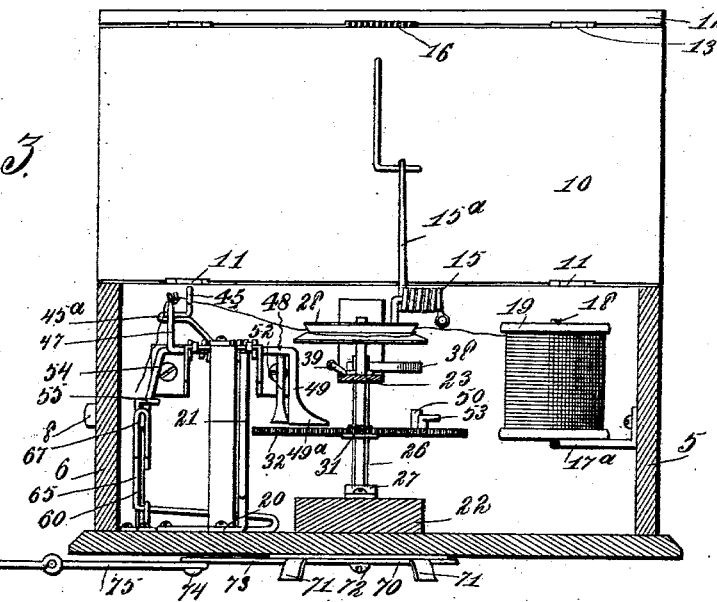

No. 694,950. Patented Mar. 11, 1902.
J. DROVER.
THREAD MEASURING AND CUTTING DEVICE FOR SPOOL CABINETS.
(Application filed Apr. 22, 1901.)

(No Model.) 3 Sheets—Sheet 3.

Witnesses:
J. F. Groat.
H. F. Berulia

James Drover, Inventor
By Marion Marion
Attorneys

UNITED STATES PATENT OFFICE.

JAMES DROVER, OF ST. JOHNS, NEWFOUNDLAND.

THREAD MEASURING AND CUTTING DEVICE FOR SPOOL-CABINETS.

SPECIFICATION forming part of Letters Patent No. 694,950, dated March 11, 1902.

Application filed April 22, 1901. Serial No. 56,828. (No model.)

*To all whom it may concern:*

Be it known that I, JAMES DROVER, a subject of the King of Great Britain, residing at St. Johns, Newfoundland, have invented certain new and useful Improvements in Thread Measuring and Cutting Devices for Spool-Cabinets; and I do hereby declare that the following is a full, clear, and exact description of the invention, such as will enable others skilled in the art to which it appertains to make and use the same.

My invention relates to improvements in spool-cabinets; and the primary object in view is to provide means by which a predetermined length of thread, which may be considered by seamstresses as a needleful, may easily be drawn from a spool and be automatically cut or severed at the required point without the operator being required to cut the thread.

Further objects are to provide means by which the thread can be drawn to any length required without being cut or severed by the automatic cutter mechanism, to provide for the safe and compact storage of any required number of spools which may contain thread of the desired color and size and which are adapted to be easily adjusted in operative relation to the thread-cutter mechanism, to promote the convenience of the seamstress in using the apparatus, and to simplify and cheapen the construction within the limit of capabilities of the structure.

With these ends in view the invention consists in the novel combination, construction, and arrangement of parts, as will be hereinafter fully described and claimed.

Figure 5:
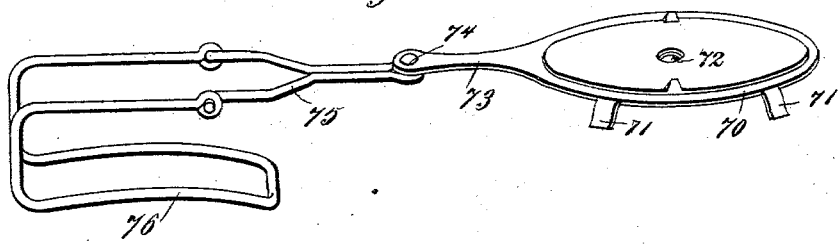
Figure 6:
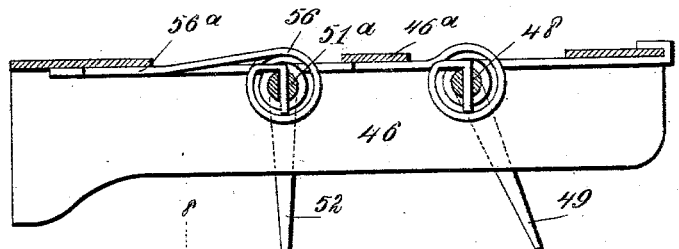
Figure 7:
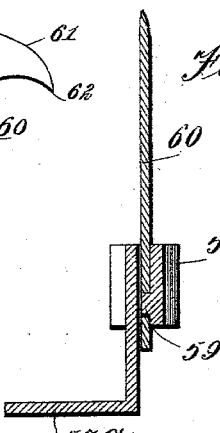
Figure 8:
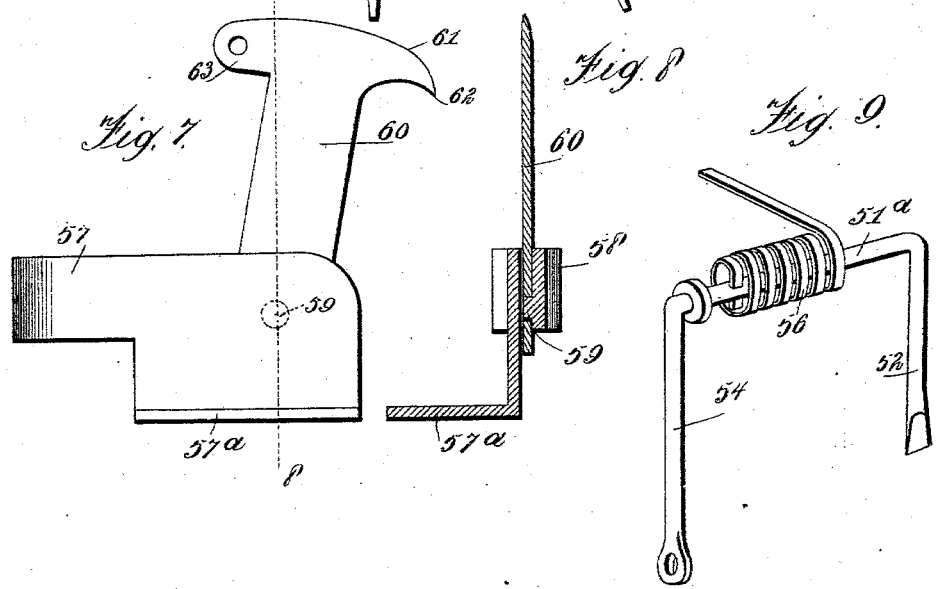
Figure 9:
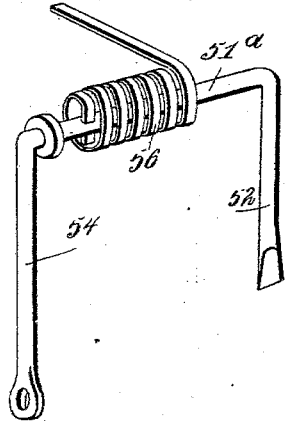

In the drawings hereto annexed, forming a part of this specification, Figure 1 is a plan view of a spool-cabinet embodying my invention and representing the cover thereof in an open condition. Fig. 2 is an end elevation of the cabinet shown by Fig. 1 and with the front thereof thrown back to an open position in order to expose the operating mechanism and to permit the thread to be easily drawn out of the cabinet. Fig. 3 is a longitudinal sectional elevation in the plane of the dotted line 3 3 on Fig. 1 looking in the direction of the arrow. Fig. 4 is an enlarged detail transverse sectional view through the apparatus, taken in the plane of the irregular line 4 4 on Fig. 1. Fig. 5 is a detail perspective view of the base and a clamp by which the cabinet may be revolubly mounted on a table or other suitable surface. Fig. 6 is a detail sectional view, on an enlarged scale, the plane of which is indicated by the dotted line 6 6 on Fig. 1. Fig. 7 is a detail fragmentary view of a cutter-supporting bracket. Fig. 8 is a transverse section thereof on the line 8 8 of Fig. 7. Fig. 9 is a detail perspective view of one of the rock-shafts representing the spring. Fig. 10 is a detail perspective view of an implement adapted to separate the yieldable part of the bracket shown by Figs. 7 and 8. Fig. 11 is a detail perspective view of the cutter-guide.

The same numerals of reference denote like parts in each of the several figures of the drawings.

5 designates the casing of my improved apparatus, the same being provided with a front door 6, which is hinged to the casing, as at 7, and is adapted to be confined in its closed position by means of a latch 8, and against this door is arranged to press a spring 9, which is attached to the casing within the latter, whereby the latch may be released and the door will be automatically thrown to its open position, as indicated by dotted lines in Fig. 1 and by full lines in Fig. 2. The casing is furthermore provided with a top consisting of the member 10, which is hinged at 11 to one edge of the casing, said top having a member 12, that is hinged at 13 to the unconfined edge of the top member 10. The top may be lowered across the casing for the purpose of having a latch 14 engage with a stud 14ᵃ on the free edge of top member 12, thereby confining the top in its closed position. An impelling-spring 15 is mounted within the casing and is provided with an arm 15ᵃ, that is operatively connected with the top member 10, and the two members 10 12 of the top are normally pressed apart by the action of a spring 16, whereby disarrangement of the latch 14 from the stud 14ᵈ permits the spring 15 to quickly throw the top member 10 to the open position shown by Figs. 1 to 3, inclusive, while the spring 16 turns the top member 12 at an angle to the other top member 10, as more clearly represented by Fig. 2.

The cabinet is adapted to contain a series of spools, which may be arranged or grouped within the casing 5 in any desired manner. As one means for supporting a series of spools, I employ a bracket 17, the same having suitable arms 17ª, which are fastened to the rear of the casing, and this bracket is provided with a series of upstanding spindles 18, three or more in number, as shown by the drawings. A spool or spools, such as 19, may be placed on one or more of these spindles, so as turn or rotate freely thereon. Another bracket 20 is provided within the casing 5, quite near the hinged door 6 thereof, said bracket having a vertical spindle 21, adapted to receive a spool of thread. In the embodiment of the invention shown by the drawings I have represented the brackets and spindles adapted to receive four spools of thread, the latter being of any desired color and size; but it is evident that the cabinet may be constructed with a number of spindles in order to contain a desired number of spools.

For the purpose of determining the length of the thread I have provided a mechanism which will be hereinafter described as a measuring mechanism, and for the purpose of cutting the thread the cabinet is equipped with a cutter mechanism. These two mechanisms—i. e., the measuring mechanism and the cutter mechanism—are operatively related one to the other in order that the cutter mechanism may be controlled or actuated by the measuring mechanism for the purpose of automatically severing or cutting the thread at a predetermined point. I will first proceed to describe the measuring mechanism, which is mounted in the cabinet in such relation to the spindles 18 and 21 that a thread from a spool on either of the spindles may be fitted to said measuring mechanism before it is passed or brought to the cutter mechanism. As one means for supporting the working parts of the measuring mechanism I have provided a cross-rail 22 on the bottom of the casing and an upper rail 23, which is secured to the sides of the casing, so as to lie in the vertical plane of the rail 22, although any suitable form of framework may be employed for supporting the measuring mechanism. To the rail 22 is secured a metallic bearing-plate 24, having a suitable step-bearing 25, adapted to accommodate the lower end of a shaft 26, the same having a collar 26ª, which is engaged by a retaining-plate 27. (See Fig. 4.) The shaft 26 passes loosely through and is partly supported by the upper rail 23, and to the upper end of said shaft is secured a pulley 28, the same arranged in a horizontal position and provided with a peripheral groove 29, the latter receiving a lining 30 of some good friction material, such as rubber, leather, or the like. The shaft 26 is provided at a point intermediate of its length with a spur-gear-pinion 31, the same arranged to have intermeshing engagement with a master-wheel 32, the latter being in the form of a gear and secured rigidly to a shaft 33. The lower portion of this shaft is mounted loosely in the step-bearing 34, which is provided in the plate 24 or the rail 22, and this shaft has a collar 35, which is engaged by a fixed retaining-plate 36. The shaft is mounted in the bearing so that it may turn freely therein and be also capable of a limited rocking movement in order that it may be tilted to the inclined position indicated by dotted lines in Fig. 4, whereby the master-wheel 32 may be withdrawn from intermeshing engagement with the gear-pinion 31 on the shaft 26. The upper portion of this shaft is fitted loosely in a slot 37, which is provided in the upper rail 23, and said shaft is normally pressed to its vertical position by the energy of a bowed spring 38, one end of which is secured to the rail 23, while the other end bears laterally against said shaft 33, as more clearly shown by Figs. 1 and 4.

I have provided a shipping-rod 39 for the purpose of manually adjusting the shaft from its vertical to the dotted-line position, said rod being arranged in a horizontal position substantially above the rail 23 and having one end thereof extending through an opening 39ª, provided in one side wall of the casing 5. The end of the rod 39 is bent to form a short arm 40, which is engaged by a crank 41 on an operating-piece 42, that is pivoted at 43 to the outside of the casing, whereby the operating-piece may be depressed, as indicated by dotted lines in Fig. 4, so as to give endwise movement to the rod 39 against the energy of the spring 38, so as to move the shaft 33 to the inclined position and withdraw the master-wheel 32 from the gear 31; but when the pressure is removed from this operating-piece the spring 38 instantly returns the shaft 33 to its vertical position, and thereby returns the master-wheel 32 back to its normal position, so as to intermesh with the gear-pinion.

It is to be understood that on the withdrawal of the master-gear from engagement with the pinion 31 the wheel or pulley 28 is free to rotate without affecting the cutter mechanism, whereby a thread of any desired length may be withdrawn from the spool in the cabinet. The length of the thread thus withdrawn may be less than the length of thread which is automatically determined by the measuring mechanism, or it may exceed the length of such thread determined by the measuring mechanism and considered ordinarily as a needleful. It is thus apparent that the described withdrawal of the master-gear permits the wheel or pulley 28 to have movement independent of the cutter mechanism; but when the operating-piece is released the master-gear is automatically thrown into engagement with the gear-pinion on the shaft 26, thus restoring the parts to normal position.

A thread-guide 44 is secured to one side of the casing at a point above the rail 23 and to extend toward the shaft 33, and through this guide may be passed a thread from a spool 19 on one of the series of spools 18, after which said thread should be passed one or more times around the grooved pulley 28, so as to have proper engagement with the friction-lining therein, and then the thread is to be passed to another thread-guide 45, the latter having operative relation to the cutter mechanism, all as clearly shown by Fig. 1. This last-described thread-guide 45 is fastened securely to a supplementary framework 46, the same being secured to a side wall of the casing and provided with a depending lug which is fastened to the bottom of the casing, said thread-guide 45 having a laterally-extending finger 45ª, which is disposed in the path of a swinging thread-arm 47, so as to form a stop for said arm and limit the upward movement thereof. (See Figs. 1, 2, and 3.) Said arm 47 is provided at its free extremity with a loop or eye 47ª, adapted to receive the thread after it is passed through the thread-guide 45, and the arm is made fast with a horizontal rock-shaft 48, the latter being journaled in proper bearings in the supplementary frame 46. Said rock-shaft is provided at its opposite end from the thread-arm with a depending trip-arm 49, that is formed into a broadened foot 49ª, lying normally in the path of a trip stud or dog 50, the latter being secured to the master-wheel 33 and projecting upwardly therefrom, so as to engage with said foot of the trip-arm. Around this rock-shaft 48 is coiled a spring 51, one end of which is secured to the shaft and the other end of which bears against a cross-bar 46ª of the supplementary frame 46, as shown by Fig. 1, said spring tending to turn the rock-shaft normally in a direction which throws the thread-arm 47 in an upwardly-inclined direction and in engagement with the stop 45ª of the thread-guide, and also disposing the trip-arm 49 in an inclined position, wherein the foot thereof lies in the path of the trip-stud 50.

51ª designates another horizontal rock-shaft, which is journaled in proper bearings in the supplementary frame 46 and at a suitable distance from the first-named rock-shaft 48, said shaft 51ª having a depending trip-arm 52, which is disposed in a different vertical plane from the trip-arm 49 of the shaft 48, so that its lower end will lie in the path of a cutter-actuating trip-stud 53 on the master-wheel, said stud 53 being disposed to one side of the stud 50 and near the perimeter of the master-wheel for the purpose of engaging with the trip-arm 52 at a period subsequent to the engagement of the stud 50 to the trip-arm 49. Furthermore, the rock-shaft 51ª is provided at its opposite end portion with a crank-arm 54, the same depending from the shaft for a suitable distance and arranged to have engagement with the hook-shaped end 55ª of a stop-arm 55, the latter being secured to a side of the casing, as shown by Fig. 1. A coiled spring 56 is fitted on the rock-shaft 51, so as to have one end secured thereto and its other end bear against the frame, as at 56ª in Fig. 6, and this spring impels the rock-shaft so that its crank-arm will engage with the hook of the stop-arm 55, while its trip 52 will be maintained in the path of the stud 53, although the rock-shaft is free to turn in a direction under the pressure of the stud 53, which will move the crank-arm 54 in a backward direction and away from the hook 55ª.

57 designates a cutter-supporting bracket having a flange 57ª, that is secured by suitable screws to the bottom of the casing, near the front door 6 thereof, and this bracket is formed with a bent yieldable arm 58, which lies alongside of the bracket proper and is furnished with a pivotal stud or lug 59, that lies between the bracket and said arm, the latter serving to support the stud and to permit it to be withdrawn a limited distance laterally from the bracket, as will be understood by reference to Figs. 7 and 8.

60 designates the cutter-blade, which is fitted loosely at its lower portion in the space between the bracket and its yieldable arm and is provided with a perforation adapted to receive the pivotal stud 59, whereby the cutter is mounted in the bracket, so as to swing on a horizontal axis. The cutter lies below the swinging thread-arm 47 and in a plane very close to the path of movement of said thread-arm, and said cutter is furnished with a curved working edge 61, which terminates in a point 62, the rear part of the cutter having a lug 63, to which is pivotally connected a link 64, the opposite end of which is pivoted to the crank-arm, as at 64ª, whereby the cutter is connected by the link to an arm of the rock-shaft 51ª.

65 designates a cutter-guide, which is shown by Fig. 11 as bent from a piece of wire, although said guide may be made of any other suitable material. The cutter-guide is formed with a vertical slot or passage-way 66, adapted to receive the cutter in the normal position of the latter. The upper portion of the cutter-guide terminates in a horn 67, having a beveled upper extremity; and below said horn the cutter-guide is furnished with the thread loops or recesses 68, the same opening downwardly and adapted to permit the thread to be easily adjusted therein. The cutter-guide is fastened to the bottom of the casing, so as to have the slotted portion thereof lie in the path of the swinging cutter, while the loops or recesses are arranged to lie quite close to the loop or eye of the thread-arm 47 when the latter is depressed, whereby the horn 67 operates to direct the thread on the descent of the arm into the loops or recesses 68, the cutter at this period being retracted, thus permitting the thread to be easily adjusted into the loops of the cutter-guide, so as to lie in the path of the cutter when the latter is impelled by the energy of the spring 56 to sever the thread at a predetermined point.

The cutter-guide 65 is provided at its lower end with an angular arm 65ª, which terminates in an eye-formed shank 65ᵇ, said arm and the shank being arranged to rest upon the bottom of the cabinet and to be secured in place by a suitable screw. A keeper 66ª is also adapted to be secured to the bottom of the cabinet, and it is provided with a bent end 66ᵇ, the same arranged to engage with the arm 65ª of the cutter-guide, as shown by Fig. 11.

The entire cabinet heretofore described may be hung on a wall or other place, so as to be within convenient reach of the seamstress; but I prefer to provide means whereby the cabinet may be revolubly supported on a sewing-machine, table, or other place, whereby the cabinet may swing around on a vertical axis, so as to supply thread conveniently to one or more seamstresses. This object is attained by the employment of a base-plate 70, having the feet 71, and through the plate passes a pivot 72, which is secured to the bottom of the cabinet, the latter resting directly upon the base-plate, as shown by Fig. 1, and free to turn on the axis afforded by the screw 72. As shown by Fig. 5, the base-plate is furnished with an offstanding finger 73, to which is pivoted at 74 a bifurcated arm 75, and to this arm is hinged or pivoted a yieldable clamp 76, which is bent or fashioned so as to embrace an edge of a table or other support. This clamp may be adjusted to the table so as to frictionally engage therewith and hold itself in place, thus maintaining the base-plate 70 against accidental displacement on a table.

By pivotally mounting the cabinet upon the base-plate at 72 it is adapted to turn in a horizontal plane on a vertical axis afforded by such pivot; but in some instances I may employ the limiting-bail 79, (see Fig. 2,) which is secured to the under side of the casing and is arranged to fit loosely beneath the finger 73 between the base and the clamp. The employment of this bail permits the cabinet to move in one direction or the other until arrested by the end of the bail engaging with the finger.

This being the construction of my apparatus, the operation may be described as follows: Assuming that a spool of thread is on one of the spindles 18, the thread is led through the guide 44, around the grooved pulley 28, through the guide 45, and in the eye 47ª of the swinging thread-arm. The front and top of the cabinet being in the open position, the end of the thread in the thread-arm 47 is readily accessible, and the seamstress can now draw the thread, which by its frictional engagement with the pulley 28 serves to rotate said pulley and the shaft 26 and also to rotate the shaft 33 through the gears 31 32. When the master-wheel 32 shall have rotated a suitable distance, the stud 50 engages with the foot 49ª of the trip-arm 49, thus turning the rock-shaft 48 and depressing the thread-arm 47, so as to bring the loop or eye thereof very close to and in alinement with the recesses 68 of the cutter-guide. During the depression of the thread-carrying arm 47 the master-wheel continues to rotate, so that the stud 53 will engage with the trip-arm 52 and rock the shaft 51ª for the purpose of making the crank-arm 54 retract the cutter before the thread-arm 47 will have reached its lowermost position. The thread is thus placed in the loops 68 of the cutter-guide before the stud 50 clears the arm 49 and allows the spring 51 to quickly lift the thread-arm 47 to its raised position, and the thread is thus retained in the cutter-guide, while the stud 53 is engaged with the trip-arm of the shaft 51 to maintain the cutter in its retracted position; but when the stud 53 clears the trip-arm 52 the spring 56 quickly actuates the crank-arm, so as to impel the cutter into the slot of the cutter-guide, whereby the operative edge 61 of the cutter will traverse the loops or recesses 68 of the cutter-guide and easily sever the thread. The thread is thus automatically cut at a predetermined point and when the proper length of thread shall have been drawn from the spool in the cabinet; but as the cutting operation takes place at a period when the thread-arm 47 is in its raised position it is evident that a free end of the thread will remain in the eye of the thread-arm 47, thus enabling the seamstress to again draw out the thread. The cutter 60 may easily be dismounted from the bracket 57 by the employment of an implement 77, such as shown by Fig. 10, said implement having an angular flattened blade 78, which may easily be thrust into the space between the bracket 57 and its yieldable arm 58, so as to force the latter and the stud 59 laterally with respect to the bracket, thereby withdrawing the stud from the opening in the cutter-plate.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. In a spool-cabinet, the combination of a measuring mechanism, a cutter-guide having means for holding a thread, a movable thread-carrying arm actuated by the measuring mechanism and arranged to automatically place a thread in said cutter-guide, a cutter operatively related to the cutter-guide, and means for actuating the cutter at a predetermined period to sever the thread confined in the cutter-guide, substantially as described.

2. In a spool-cabinet, the combination of a measuring mechanism, a cutter, a movable thread-carrying arm arranged to place a thread in the path of said cutter, and means actuated by the measuring mechanism to operate both the cutter and said thread-carrying arm one after the other, whereby the arm first places the thread in the path of the cutter and then the cutter is actuated to automatically sever the thread, substantially as described.

3. In a spool-cabinet, the combination of a measuring-wheel, a master-wheel, a cutter having operative connection with said master-wheel to be actuated intermittently thereby, and a movable thread-carrying arm also connected operatively with said master-wheel and arranged to place a thread automatically in the path of the cutter, substantially as described.

4. In a spool-cabinet, a measuring mechanism comprising shafts normally intergeared, a measuring-wheel, and means for adjusting said parts to permit the measuring-wheel to have a free rotation, combined with a cutter actuated by the measuring mechanism, and a movable thread-carrying arm also actuated by the measuring mechanism and arranged to place a thread in the path of the cutter, substantially as described.

5. In a spool-cabinet, the combination of a measuring mechanism having an element disposed in the path of the thread, a cutter-guide having means for holding a thread, a movable thread-carrying arm having means actuated by the measuring mechanism and arranged to move a thread into engagement with the cutter-guide and into the path of the cutter, a rock-shaft also actuated at a predetermined point by the measuring mechanism, and a movable cutter operatively connected with the rock-shaft and adapted to be actuated through the latter by the measuring mechanism, substantially as described.

6. In a spool-cabinet, a measuring mechanism comprising two shafts, a friction wheel or pulley on one of the shafts, a master-wheel on the other shaft, and trip devices carried by the master-wheel, in combination with a cutter, a thread-carrying arm having a trip element disposed in the path of one of said trip devices on the master-wheel, and another trip element having operative connection with the cutter and disposed for actuation by the other trip device on the master-wheel, substantially as described.

7. In a spool-cabinet, the combination of independent rock-shafts each having a trip-arm, a thread-arm carried by one rock-shaft, and a cutter having operative connection with the other rock-shaft, a master-wheel provided with trip devices arranged to successively engage with the trip-arms of said rock-shafts, and a thread-actuated element arranged to impart rotation to said master-wheel, substantially as described.

8. In a spool-cabinet, the combination of a cutter-guide provided with thread-loops, a movable cutter arranged to traverse the thread-loops of said guide, a thread-carrying arm movable into operative relation with the thread-loops of the cutter-guide, and a measuring mechanism having means whereby the thread-carrying arm and the cutter may be actuated successively, substantially as described.

9. In a spool-cabinet, the combination of a tiltable shaft having a master-wheel, another shaft having a thread-engaging element and geared to the master-wheel, means for manually adjusting said master-wheel shaft to disengage the master-wheel from the shaft of the thread element, and a cutter mechanism adapted to be actuated by said master-wheel, substantially as described.

In witness whereof I have hereunto set my hand in the presence of two witnesses.

JAMES DROVER.

Witnesses:
HERBERT KNIGHT,
JOS. GREENE.